US010200831B2

(12) United States Patent
Yang et al.

(10) Patent No.: US 10,200,831 B2
(45) Date of Patent: Feb. 5, 2019

(54) MANAGING COMMUNICATIONS IN HETEROGENEOUS COMMUNICATION NETWORKS

(71) Applicant: T-Mobile USA, Inc., Bellevue, WA (US)

(72) Inventors: Jianchong Yang, Issaquah, WA (US); Dajin Hu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 166 days.

(21) Appl. No.: 15/159,662

(22) Filed: May 19, 2016

(65) Prior Publication Data

US 2017/0339538 A1    Nov. 23, 2017

(51) Int. Cl.
*H04W 4/14* (2009.01)
*H04W 8/12* (2009.01)
*H04L 29/06* (2006.01)
*H04Q 3/00* (2006.01)

(52) U.S. Cl.
CPC ............ *H04W 4/14* (2013.01); *H04L 65/102* (2013.01); *H04Q 3/0025* (2013.01); *H04W 8/12* (2013.01); *H04L 65/1016* (2013.01)

(58) Field of Classification Search
CPC ...................................................... H04W 4/14
See application file for complete search history.

(56) References Cited

U.S. PATENT DOCUMENTS

| 6,683,881 | B1 * | 1/2004 | Mijares | ................... | H04L 12/66 340/3.1 |
| 6,760,343 | B1 * | 7/2004 | Krishnamurthy | .... | H04Q 3/0025 370/338 |
| 7,502,339 | B1 * | 3/2009 | Pirkola | ................... | H04L 12/66 370/310 |
| 2006/0115069 | A1 * | 6/2006 | Fudge | ................. | H04Q 3/0025 379/230 |
| 2006/0135133 | A1 * | 6/2006 | Cai | ........................ | H04L 51/12 455/414.1 |
| 2006/0262916 | A1 * | 11/2006 | Marascio | .......... | H04L 29/06027 379/201.01 |

(Continued)

*Primary Examiner* — Charles N Appiah
*Assistant Examiner* — Frank E Donado
(74) *Attorney, Agent, or Firm* — Knobbe, Martens, Olson & Bear, LLP

(57) ABSTRACT

An IP short message gateway (IP-SM-GW) utilizes multiple addresses for delivering short messages between an IP network and a cellular network. The IP short message gateway can have multiple SCCP addresses that correspond to categories of origin/destination IP addresses of short messages. In response to a request to deliver a short message between an IP network and a cellular network, the IP short message gateway identifies an IP address associated with the origin/destination of the short message. The IP short message gateway then identifies at least one of its multiple SCCP addresses based on the identified IP address. The IP short message gateway can generate a response message that includes the identified SCCP address. The identified SCCP address in the response message will be available to SMSC or IMS. SMSC or IMS can implement differentiated handling of short messages based on SCCP addresses received from the IP short message gateway.

9 Claims, 6 Drawing Sheets

(56) References Cited

U.S. PATENT DOCUMENTS

| | | | | |
|---|---|---|---|---|
| 2011/0165899 | A1* | 7/2011 | Wright | H04L 51/14 |
| | | | | 455/466 |
| 2012/0057573 | A1* | 3/2012 | Piscopo | H04L 65/104 |
| | | | | 370/338 |
| 2014/0334481 | A1* | 11/2014 | Boire-Lavigne | H04L 29/125 |
| | | | | 370/352 |

* cited by examiner

MANAGING COMMUNICATIONS IN HETEROGENEOUS COMMUNICATION NETWORKS

BACKGROUND

Generally described, computing devices can be used to exchange data via a communication network. In one embodiment, mobile computing devices utilize a wireless communication network provided by a wireless service provider to facilitate the exchange of information in accordance with one or more wireless communication protocols. For example, a wireless service provider can maintain a wireless communication network in which a set of mobile devices are configured to exchange information in accordance with a second generation wireless communication protocol, such as the Global System for Mobile Communication wireless communication protocol (e.g., GSM). In another example, the wireless service provider can also maintain another wireless communication network in which another set of mobile devices are configured to exchange information in accordance with a third generation or fourth generation wireless communication protocol such as the Wideband Code Division Multiple Access ("WCDMA") or Long Term Evolution ("LTE") wireless communication protocols. In the above example, the wireless communication networks of the wireless service provider may or may not share common network components.

Various wireless interface standards, such as second, third and fourth generation wireless communication protocols, are configured to facilitate the transmission of information, such as short messages (e.g., "text messages") between mobile devices. For example, many second generation wireless communication protocols, such as GSM, define a specific messaging data structure that is utilized in the exchange of information between mobile devices. Similarly, third and fourth generation wireless communication protocols, WCDMA and LTE, also define a specific messaging data structure for exchanging information between mobile devices. However, the messaging formats between second generation wireless communication protocols and third and fourth generation wireless communication protocols do not typically share a common format. More specifically, because third and fourth generation wireless communication protocols utilize a packet-based data delivery, also referred to as an IP-based communication network, the messaging format implemented in these types of IP-based communication networks is different from the messaging format implemented in non-IP-based communication networks.

Because of incompatibilities in messaging formats associated with different wireless communication protocols, wireless service providers will often provide additional components that are configured to mediate messages created on a mobile device operating in accordance with one wireless communication protocol (e.g., an IP-based communication network) to be received by another mobile device operating in accordance with a different wireless communication protocol (e.g., a non-IP-based communication network). Such mediation can often require the network components to translate messages formed in format compatible with a first communication protocol into messages formed in a format compatible with a second communication protocol. Often, however, some information, such as addressing information, may be lost as part of the translation process, which limits the service provider from utilizing addressing information at a later point.

BRIEF DESCRIPTION OF DRAWINGS

The foregoing aspects and many of the attendant advantages of this disclosure will become more readily appreciated as the same becomes better understood by reference to the following detailed description, when taken in conjunction with the accompanying drawings, wherein.

DETAILED DESCRIPTION

Figure 1:
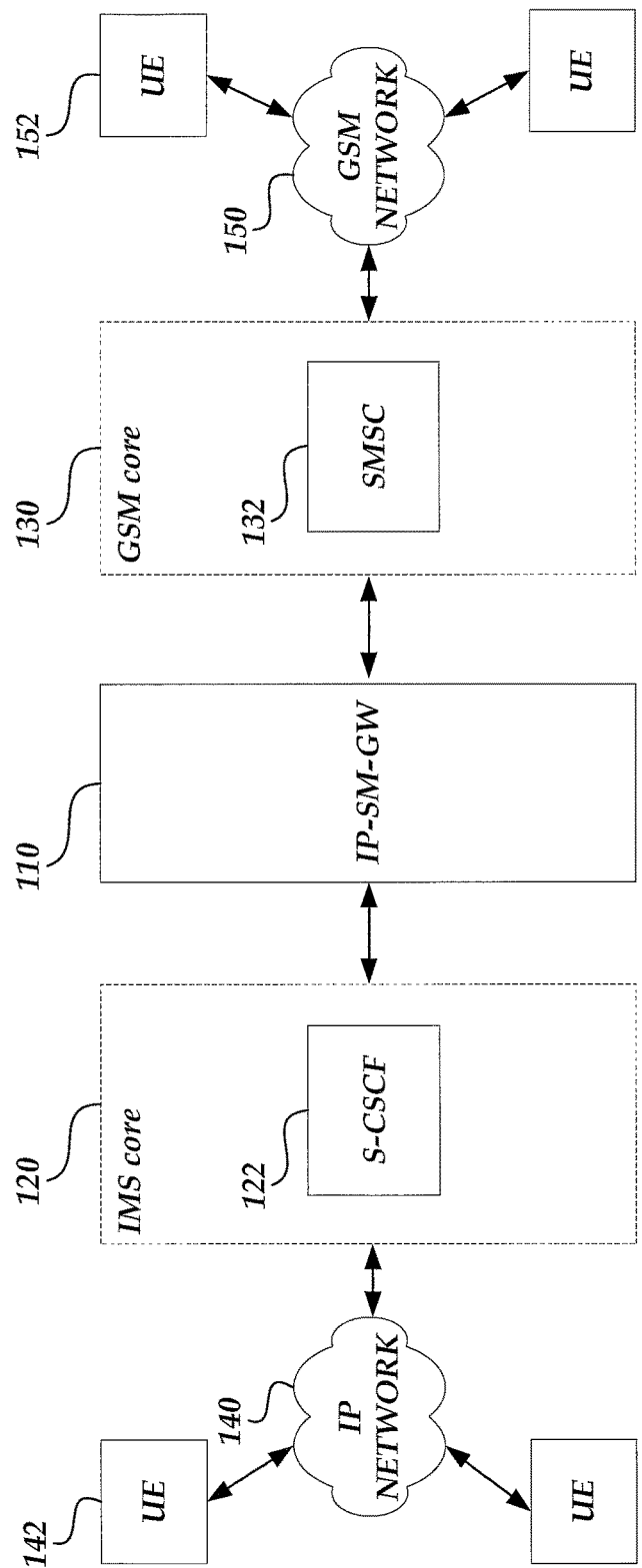
FIG. 1 is a block diagram depicting an illustrative operating environment for facilitating short message delivery between devices operating in an IP-based communication network and device operating in a non-IP-based communication network.

Generally described, aspects of the present disclosure relate to managing information exchanged between communication networks. More specifically, aspects of the present application relate to the management of information exchanged between mobile devices utilizing IP-based networks and mobile devices utilizing non-IP-based—based networks. For ease of discussion, the networks will be generally referred to as an "IP network" and a "non-IP network," respectively. Illustratively, systems and methods are disclosed to facilitate delivery of short messages or text messages between IP-based networks and non-IP—based networks. The delivery of the short messages is configured to facilitate differentiated services based on network information.

In accordance with an aspect of one embodiment, a computer implemented method is provided for handling a short message between an IP network and a non-IP-based network. The method includes receiving a request to deliver a short message between the IP network and the non-IP-based network. The method also includes identifying an IP address (or other identifier) associated with origin or destination of the short message in the request and identifying a SCCP (Signaling Connection Control Party) address or other parameter which corresponds to the identified IP address. The method further includes generating a message based on the identified SCCP address and transmitting the generated message to the SMSC of the cellular network.

In accordance with another aspect of one embodiment, a computer system that has multiple SCCP addresses (or other alternative parameter) can handle short message delivery between an IP network and a non-IP-based network. The computer system is configured to receive a request to deliver a short message between an IP network and the non-IP-based network. The request includes an IP address (or other alternative identifier/information) associated with origin or destination of the short message. The computer system is further configured to identify a SCCP address among the multiple SCCP addresses of the computer system based on the IP address in the request. In response to the request to deliver a short message, the computer system can transform the request to a message which comprises the identified SCCP address (or other parameter) according to a target protocol and transmits the generated message to SMSC of the non-IP-based network (cellular network).

In accordance with yet another aspect of one embodiment, a computer-readable medium is provided having instructions encoded thereon to facilitate short message delivery between an IP network and a non-IP network. The instructions cause a computer system that has a plurality of SCCP addresses (or another parameter in a target protocol) to receive a request to deliver short message between an IP network and the non-IP network. The instructions further cause the computer system to identify a SCCP address among the plurality of SCCP addresses of the system based on IP address (or other identifier) included in the request. The instructions further cause the computer system to generate a message comprising the identified SCCP address. The generated message can be transmitted to SMSC for facilitating short message delivery between an IP network and the non-IP network.

Specific embodiments and example applications of the present disclosure will now be described with reference to the drawings. These embodiments and example applications are intended to illustrate, and not limit, the present disclosure.

FIG. 1 illustrates an operating environment for facilitating the processing of Short Message Service (SMS) and SMS messages. In general, Short Message Service (SMS) refers to a text messaging service component utilized in mobile communication systems. A text message delivered by SMS can be called a short message. As illustrated in FIG. 1, the operating environment of short message delivery management can include an IP Short Message Gateway ("IP-SM-GW") 110, an IP Multimedia Subsystem ("IMS") core 120, a Call Session Control Function ("S-CSCF") 122, a Global Service Messaging ("GSM") core 130, SMSC 132, IP network 140, GSM network 150, and user equipment (142, 152).

Illustratively, the IP short message gateway 110 corresponds to a computing device or a set of computing devices (a set of IMP systems) that provides the protocol interworking for converting and delivering of short messages between the IP based user equipment 142 and SMSC 132. General functions of the IP short message gateway includes determining the domain for delivery of a short message, connecting SMSC 132 using Mobile Application Part ("MAP"), communicating with a Home Subscriber Server ("HSS") to update or obtain IMS subscriber registration information including IP address (or other identifier), and communicating with HLR a Home Location Register ("HLR") using established MAP protocols to obtain the address of MSC for short message termination. An interface allows the IP short message gateway (IP-SM-GW) to connect to SMSC (SMS-GMSC) 132 using MAP (Mobile Application Part) for exchanging SRI_SM, MO, MT SMS and other similar commands with SMSC. The IP Multi-Media Subsystem Service Control Interface ("ISC") interface allows the IP short message gateway to exchange IMS registration, SIP messages (mobile originated or mobile terminated) and other commands with IMS core.

In an illustrative embodiment, the IP short message gateway 110 has multiple Signaling Connection Control Part ("SCCP") addresses in contrast to a traditional IP short message gateway that has only one SCCP address. The multiple SCCP addresses can correspond to categories, ranges or types of IP addresses (or other identifier) that can be involved in short message from/to the IP network. In response to a short message delivery request associated with an IP address, IP short message gateway 110 generates a message to other network elements, like SMSC 132, by utilizing one of the multiple SCCP addresses that corresponds to the IP address associated with the short message deliver request rather than by using the same SCCP address for all short message delivery requests. Accordingly, IP address information associated with a short message delivery request can be transmitted by the SCCP address representing the IP address. Thus, differentiated handling of short messages based on IP addresses (other identifier) associated with the short messages can be implemented by network elements that have access to SCCP addresses representing IP addresses.

For example, an SCCP address can correspond to geographical information (country code, ZIP code) identified from an IP address (or other identifier). The SCCP addresses that are indicative of geographical information associated with short messages can be utilized to provide differentiated handling of the short messages based on the geographical information for various purposes of billing, authorization, security, etc. For another example, SCCP addresses can indicate service providers of the IP network. In some embodiments, IP short message gateway 110 and/or other network elements would allow delivery of a short message between IP network 140 and GSM network 150, only if a service provider represented by the SCCP address is an allowed service provider based on the operation policy of GSM network 150.

Multiple SCCP addresses (or other alternative parameters in a target protocol) of the IP short message gateway can be stored in the IP short message gateway. The multiple SCCP addresses can be utilized to distinguish short messages associated with different sets of IP addresses (or other identifiers). Features of the IP short message gateway 110 will be described in further detail with reference to the following figures.

IMS core 120 refers to core session control elements of the IP Multimedia Subsystem and includes S-CSCF 122. In general, the IMS core 120 carries out SIP signaling functions at IP network (IMP network) side. IMS core 120 employs SIP for session management, including, for example, to establish, modify, and terminate media sessions for various applications. The collective CSCF are used to process SIP signaling packets. Also, IMS core 120 can include multiple S-CSCFs for load distribution and for high availability.

S-CSCF 122 is a central node of signaling. S-CSCF 122 is a SIP server, and performs session control too. In general, the S-CSCF 122 handles SIP registration which possibly allows S-CSCF 122 to bind user location (e.g., the IP address of the terminal or other identifier) and SIP address. General functions of the S-CSCF 122 also include inspection of signaling messages, enforcement of network operator's policy and routing services, and typically using Electronic Numbering (ENUM) lookups. The S-CSCF 122 can transmit a SIP message to the IP short message gateway 110 in response to a short message submission from the user equipment 142 in IP network 140. The transmitted SIP message can include IP address indicative of origin of the short message.

GSM core 130 is a set of systems (network elements) to support mobile telephone service via the GSM network. GSM core 130 can includes various GSM core network elements including MSC (mobile switching center), HLR (Home location register), AuC (authentication center), VLR (visitor location register) and SMSC (Short message service center). MSC is a service delivery node for GSM network, responsible for routing voice calls and short messages among other signaling operations. Tasks of the MSC include delivering calls to subscribers based on information from VLR, generating billing information and delivering SMSs from subscribers to SMSC, and vice versa.

SMSC 132 is a GSM core network element to support short message delivery. In general, functions of the SMSC 132 can include storing, forwarding, and delivering of text messages. Also the SMSC 132 is responsible for maintenance of unique time stamps in text messages. To deliver short messages between the IP network and GSM network 150, the SMSC 132 can communicate with the IP short message gateway 110 using MAP (Mobile Application Part).

The user equipment 142, 152 may be electronic devices capable of communicating with one another over networks including IP network 140 and cellular network 150. In some embodiments, user equipment 142, 152 may include computing devices, wireless devices such as mobile phones, wireless PDA's, wireless devices with high-speed data transfer capabilities, such as those compliant with 3G or 4G standards, and the like. As will be well appreciated, the computing/communication devices may include a variety of configurations or forms such as, but not limited to, laptop or tablet computers, personal digital assistants (PDAs), smart phones, media players, home messaging hub devices, and the like.

For purposes of illustration, a first set of user equipment 142 is connected with IP network 140 and registered to the S-CSCF 122. Registration procedure of the user equipment 142 may include establishing an IP connection, registering at the S-CSCF according to IMS registration procedure, checking filter criteria by the S-CSCF 122, sending register request to HSS (not shown) by IP-SM-GW, etc. The first user equipment 142 can initiate a process to send a short message to the second user equipment 152 by submitting a short message to the S-CSCF 122 using an appropriate SIP method. Similarly, a second set of user equipment 152 is connected to GSM network 150. The second user equipment 152 can receive a short message from the first user equipment 142 and send a short message to the first user equipment 142 via the GSM network 150. In FIG. 1, we illustrated GSM network 150 as only an example of non-IP-based network, and IP short message gateway 110 can be implemented between IP network and other type of non-IP network using different technologies like CDMA and LTE.

Figure 2:
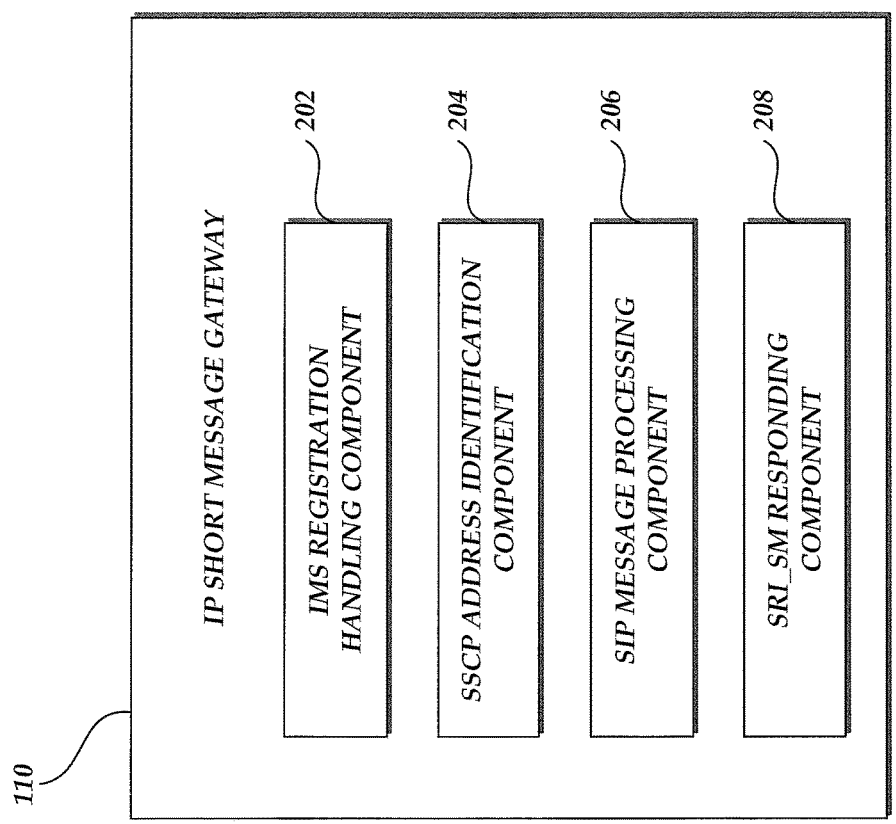
FIG. 2 is a block diagram illustrative of an IP short message gateway.

FIG. 2 illustrates the IP short message gateway according to an embodiment according of the present invention. As illustrated in FIG. 2, the IP short message gateway 110 includes IMS registration handling component 202, SSCP address identification component 204, SIP message processing component 206 and SRI SM responding component 208. In some embodiments, the IP short message gateway 110 may include a separate component for converting MT SMS to IMS SIP MT text or for converting IMS SIP MO text to MO SMS.

IMS registration handling component 202 is operable to process a registration information (Third Party Registration, TPR) received from S-CSCF 122 for handling IMS device registration. In response to the registration information from S-CSCF 122, IMS registration handling component retrieves IP address (or other identifier) of user equipment connected to the IP network 140. IMS registration handling component can store the IP address (or other identifier) retrieved from the registration information at a local storage of the IP short message gateway in association with a corresponding SCCP address. IMS registration handling component can transmit the IP address (or other identifier) retrieved from the registration information to HSS such that HSS can store mapping between the IP address (or other identifier) and SSCP address. IP address (or other identifier) and its mapping to SSCP address stored in HSS can be utilized by a computing system (IMP) to handle a MT SMS to be delivered to user equipment 142 registered in the IP network 140.

SSCP address identification component 204 is operable to identify, among multiple SCCP addresses of the IP short message gateway 110, a SCCP address based on an IP address (or other identifier) associated with short message delivery request. Identified SCCP address can be utilized by SIP message processing component 206 and SRI SM responding component 208 to compose a message in response to short message delivery request.

SCCP addresses assigned to the IP short message gateway can correspond to a plurality of IP address groups (ranges) respectively. The plurality of IP address groups can be organized based on one or more criteria. For example, IP addresses can be organized into a plurality of groups based on geographical information, organizational information, service provider information associated with IP address, etc. The SCCP address identified by SSCP address identification component 204 can be transmitted to the network elements involved, directly or indirectly, in short message delivery. Therefore, information about the IP address group represented by the transmitted SCCP address would be available to the network elements and would cause the network elements to implement various features based on the information about IP address group.

In some embodiments, the IP short message gateway 110 stores association (mapping) between IP addresses and the multiple SCCP addresses at a local storage and find a corresponding SCCP address without external reference. In some embodiments, the IP short message gateway 110 can cooperate with a separate system like HSS that stores association between IP addresses and the multiple SCCP addresses. For example, the SSCP address identification component 204 transmits an IP address to a separate system which will return a country/service-provider code associated with the IP address. Based on the returned code, the SSCP address identification component 204 can determine a SCCP address corresponding to the IP address. In some embodiments, HSS can return a corresponding SCCP address based on an IP address included in a query from IP short message gateway 110.

SIP message processing component 206 is operable to process SIP messages received from IMS core 120 and to generate a MAP message based on the SIP message. The SIP message from IMS core 120 can include an IP address or other identifier indicative of the origin of a short message. For example, when user equipment 142 is using a Wi-Fi access point for IP connection, the public IP of the Wi-Fi access point may be transmitted to S-CSCF 122 along with the text (SMS) message submission from the user equipment 142. In response to the SMS submission for user equipment 142, S-CSCF 122 generates a SIP message containing the IP address associated with user equipment 142. For example, the generated SIP message can contain the IP address of user equipment 142 or the IP address of a router that provides IP connection to user equipment 142. Using the IP address contained in the SIP message, SIP message processing component 206 obtains a SSCP address corresponding to the IP address. In some embodiments, SIP message processing component 206 transmits the IP address contained in the SIP message to SSCP address identification component 204 to obtain SCCP address corresponding to the IP address. SSCP address identification component 204 identifies a SCCP address using the IP address and transmits the SCCP address to SIP message processing component 206. SIP message processing component 206 generates a MAP message with the SCCP address identified by SSCP address identification component 204. More specifically, the identified SCCP address can be included in the generated MAP message as the calling party address. The generated MAP message containing the identified SCCP address is then transmitted to SMSC 132.

SRI SM responding component 208 is operable to process a SRI SM received from SMSC 132 and to generate a response to the SRI SM. SRI SM is a request of routing information to deliver the short message to a destination user equipment. In response to a SRI SM from SMSC 132, SRI SM responding component 208 determines that the destination user equipment is registered in the IP network 140. SRI SM responding component 208 can determine registration information (associated IP address) of the destination user equipment (recipient of short message) exists in local storage of the IP short message gateway 110. In some embodiments, if registration information of the recipient device is not available in the local storage, the IP short message gateway asks HSS for registration information of the destination user equipment. When the IP address associated with the recipient (destination user equipment) is available, SRI SM responding component 208 obtains a SCCP address corresponding to the IP address. In some embodiments, SRI SM responding component 208 transmits the IP address to SSCP address identification component 204 and, in return, obtains a corresponding SCCP address from SSCP address identification component 204. The obtained SCCP address corresponds to the IP address associated with the destination user equipment. Using the obtained SCCP address, the SRI SM responding component 208 generates a response to the SRI SM and sends the response to SMSC 132. The response to the SRI SM includes the SSCP address of the IP short message gateway 110 that corresponds to the IP address associated with the destination user equipment.

As noted above, IP short message gateway 110 with multiple SCCP addresses can deliver, between IP network and non-IP-based network, IP address information (or other information) which a traditional IP short message gateway with only one SCCP address could not deliver.

The IP short message gateway (IP-SM-GW) 110 is configured to handle short message delivery between IMS core 120 and GSM core 130. Illustratively, the IP short message gateway 110 may be associated with various physical computing resources, such as one or more central processing units, memory units (e.g., RAM), mass storage or persistent memory units, and graphics processing units. Generally, the IP short message gateway 110 may execute on one or more processing units, such as one or more CPUs. The IP short message gateway 110 may also include system memory (not shown), which may correspond to any combination of volatile and/or non-volatile storage mechanisms. The system memory may store information that provides an operating system component, various program modules, program data, or other components. The IP short message gateway 110 performs functions using the processing unit(s) to execute instructions provided by the system memory. The IP short message gateway 110 may also include one or more types of removable storage and one or more types of non-removable storage. Still further, the IP short message gateway 110 can include communication components for facilitating communication via wired and wireless communication networks. For example, the IP short message gateway 110 may be configured to communicate with a storage service over such a network.

Figure 3:
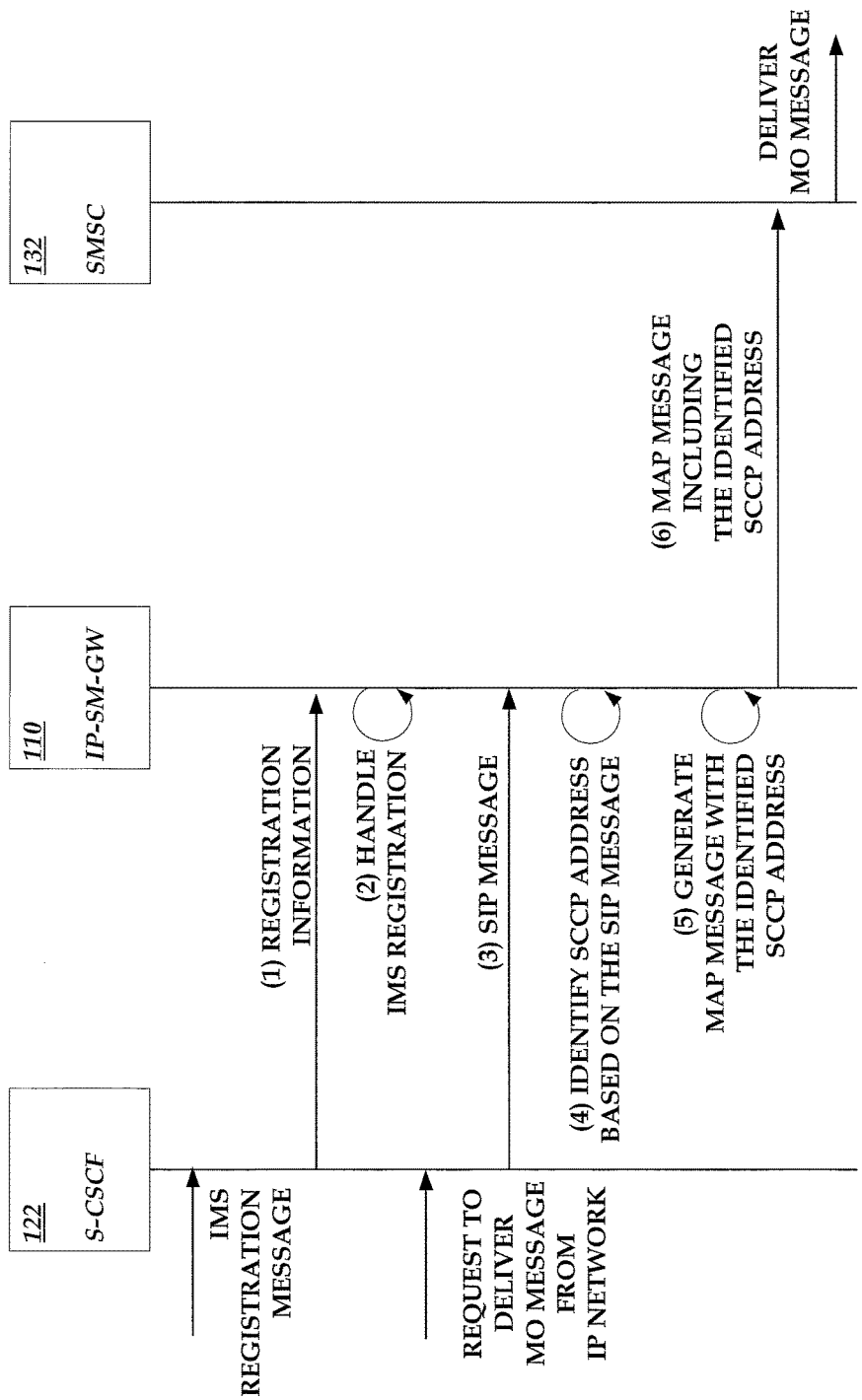
FIG. 3 is a block diagram of the operating environment of FIG. 1 illustrating processes of delivering a short message initiated in an IP network.

FIG. 3 illustrates a block diagram of processes of delivering a short message initiated in an IP network to a cellular network.

At (1), for IMS registration of user equipment 142 connected to IP network 140, the IP short message gateway 110 receives registration information from the S-CSCF 122. The registration information includes IP address or other identifiers associated with user equipment 142.

At (2), the IP short message gateway 110 retrieves IP address (or other identifier) of user equipment. The IP short message gateway 110 identifies, among its assigned SCCP addresses, a SCCP address that corresponds to the user equipment 142. The IP short message gateway 110 can store the IP address (or other identifier) retrieved from the registration information at a local memory/storage of the IP short message gateway in association with a corresponding SCCP address. In some embodiments, the IP short message gateway 110 can transmit information representing association between the IP address (or other identifier) and the corresponding SCCP address to HSS such that HSS can store the IP address or the association along with other registration information. As such, while handling IMS registratration, IP short message gateway 110 identifies and stores association between a SSCP address and an IP address (or other identifier) of user equipment at its local strorage and/or a remote system like HSS.

At (3), in response to MO SMS (mobile originated SMS) submission from user equipment 142 registered in the IP network 140, the S-CSCF 122 sends a SIP message including an IP address (or other identifier) associated with user equipment 142 which is the origin of the short message. For example, when the user equipment 142 sends a short message via Wi-Fi hotspot, the submission (request) received by the S-CSCF 122 includes public IP address of Wi-Fi hotspot. The public IP address of the Wi-Fi hotspot can be carried to the IP short message gateway 110 by SIP message generated by the S-CSCF 122.

At (4), the IP short message gateway 110 identifies, among its assigned SCCP addresses, a SCCP address that corresponds to the user equipment 142 based on the SIP message received from the S-CSCF 122. In some embodiments, the IP short message gateway, using an IP address contained in the SIP message, refers to its local strorage and/or HSS to find a SSCP address that was associated with the IP address during the IMS registration process. In some embodiments, when no IMS registration has been conducted or IMS registration is outdated for an IP address contained in the SIP message, the IP short message gateway can newly identifies and stores association between a SSCP address and an IP address (or other identifier) of user equipment as in a IMS registration process. The identified SCCP address may represent a class, type or category of the origin of the short message to be transmitted to GSM network 150. In some embodiments, the IP short message gateway configured with multiple SCCP addresses can include a local storage that stores association (mapping) between IP addresses and SCCP addresses. The IP short message gateway 110 can refer to the local storage to find a corresponding SCCP address based on the IP address (or other identifier) in the SIP message. In some embodiments, the IP short message gateway configured with multiple SCCP addresses can include a local storage that stores association (mapping) between countries/regions and SCCP addresses. The IP short message gateway can forward the IP address (or other identifier) in the SIP message to an external system to find a country/region corresponds to the IP address. The external system can return information representing a country/region that corresponds to the IP address. When the external system returns the information representing country/region of the IP address the IP short message gateway can refer to a local storage storing association between SCCP addresses and countries/regions of IP addresses.

With continued reference to FIG. 3, at (5), the IP short message gateway 110 generates a MAP message based on the SCCP address identified from its multiple SCCP addresses. While composing the MAP message, IP short message gateway 110 places the identified SCCP address rather than the IP address carried by the SIP message. Source location of the MO SMS can be determined based on the SCCP address corresponding to the IP address (or other identifier) carried by the SIP message at (3).

At (6), the generated MAP message is transmitted to the SMSC 132. The SMSC 132 initiates process to deliver a short message based on the MAP message received from IP short message gateway 110. Delivery of short message to destination user equipment 152 can be conducted in cooperation with other network elements of GSM core 130. Upon successful delivery of the short message, a CDR (call detail record) can be generated. A CDR can include SCCP address carried by the MAP message. Based on the CDR containing SCCP addresses which may indicate origin/destination of short messages, network components of the GSM core 130 can provide various services corresponding to origin/destination of short messages. For example, billing center of the GSM core 130 can implement various building policies based on origin/destination of short messages. In some embodiments, either of IP short message gateway 110 or SMSC 132 can hold or reject short message delivery when origin/destination phone numbers and or origin/destination SCCP addresses (which can represent different locations) of the short message is not allowed to send/receive short messages between two networks under a specific billing policy. In some embodiments, either of IP short message gateway 110 or SMSC 132 can perform different charging in real time based on origin/destination phone numbers and or origin/destination SCCP addresses (which can represent different locations) of the short message between two networks under a specific billing policy. When the generated MAP message delivered to SMSC 132 meets all requirements for short message delivery SMSC 132 transmits a short messages to user equipment 152 registered in GSM network 150.

Figure 4:
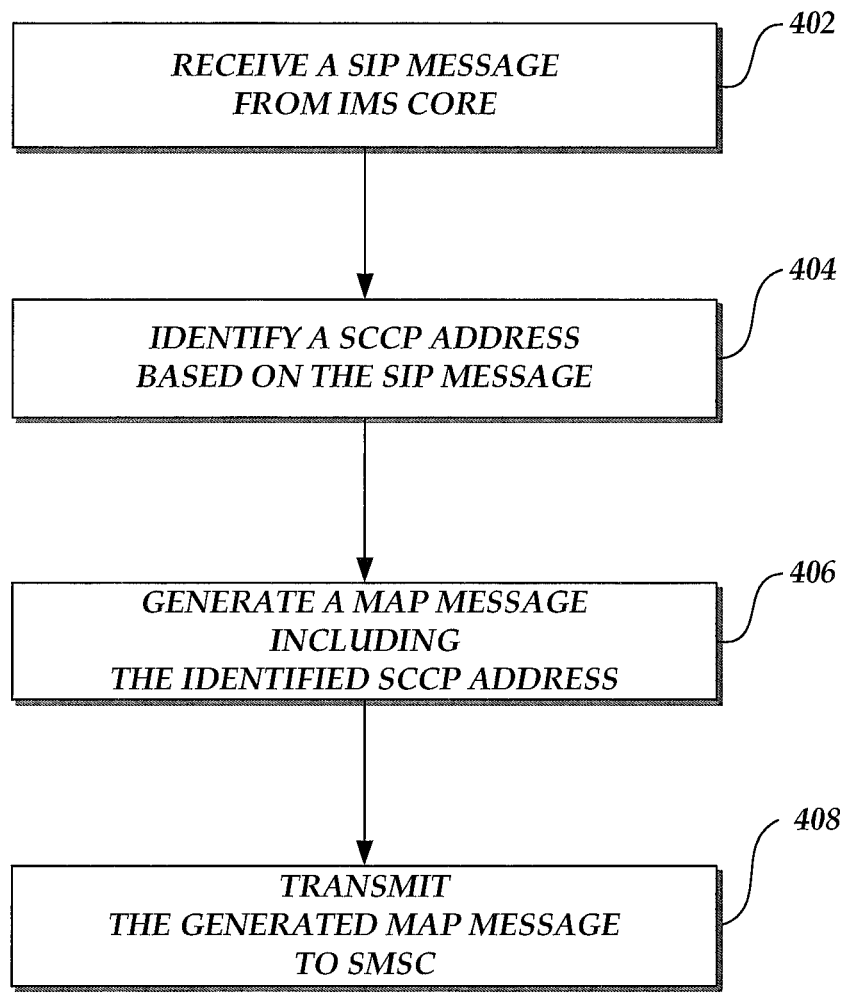
FIG. 4 is a flow diagram illustrative of delivering a short message initiated in IP network implemented by an IP short message gateway.

FIG. 4 is a flow diagram illustrative of delivering a short message initiated in IP network. IP short message gateway 110 configured with multiple SCCP addresses can carry out the steps illustrated in FIG. 4 to deliver a mobile originated short message to the user equipment registered in the cellular network.

At block 402, the IP short message gateway 110 receives a SIP message from IMS core 120 which received a submitted SMS from the user equipment 142 registered in IP network 140. The SIP message can include body text and IP address (or other identifier) indicative of origin of a short message.

At block 404, SSCP address identification component 204 of the IP short message gateway 110 identifies, among a plurality of SCCP addresses assigned to the IP short message gateway 110, a SCCP address to be included in the MAP message toward the GSM core 130. SCCP address identification component 204 can identify a SCCP address representing a class, type or category of the location of the user equipment (origin of the short message) by looking up a local storage or by cooperating with another network element connected to the IP short message gateway 110.

At block 406, SIP message processing component 206 of the IP short message gateway 110 can process the SIP message received from the S-CSCF 122 to generate a MAP message based on a SCCP address identified by the SCCP address identification component 204. In some embodiments, prior to generating MAP message, using the identified SCCP address, the IP short message gateway 110 may verify that the user equipment that has submitted SMS is qualified to request short message delivery, may or may not in corporation with other network elements.

At block 408, IP short message gateway 110 transmits the generated MAP message to SMSC 132 for short message delivery toward user equipment 152 registered in GSM network 150. As SCCP address contained in the MAP message can provide information about network service provider or location of network which enables IP connection for user equipment 142 that submitted short message, network elements of the GSM core 130 can take various actions based on the information about network service provider. In some embodiments, different billing policies for short message delivery can be applied for network service providers. In some embodiments, statistics about origin networks of short messages can be analyzed for communication system reliability and security.

Figure 5:
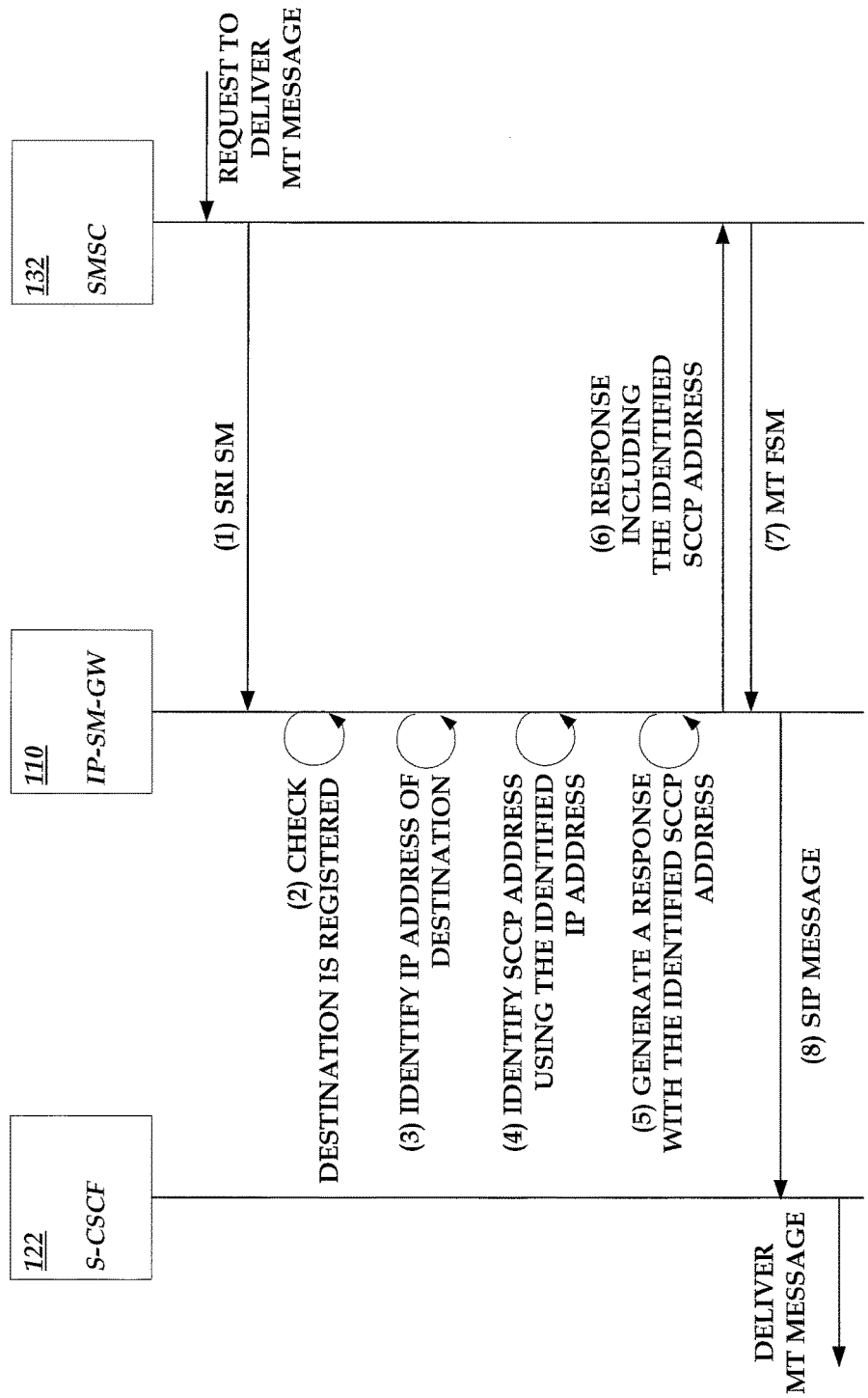
FIG. 5 is a block diagram of the operating environment of FIG. 1 illustrating processes of delivering a short message to a mobile device in IP network.

FIG. 5 is a block diagram illustrating processes of delivering a short message to a mobile device in IP network.

At (1), after receiving a short message submitted from user equipment 152 registered in GSM network 150, SMSC 132 send SRI SM (Send Routing Information for Short Message) to IP short message gateway to obtain routing information for short message delivery.

At (2), IP short message gateway 110 verifies that the destination of the short message is registered at IMS core 120 with or without cooperation with other network elements. To verify IMS registration of the destination, IP short message gateway 110 can look up IMS registration information stored at a local storage (or memory) or at HSS. The registration information can contain an association between a SCCP address identified and an IP address (or other identifier) of IP network that recipient user equipment 142 is registered at, or, only a SCCP address that was identified to be associated to an IP address (or other identifier) of IP network that recipient user equipment 142 is registered at.

At (3) and (4), when IMS registration of the destination is verified, IP short message gateway 110 identify SCCP address that is associated to the IP address (or other identifier) of the destination to which the short message will be delivered. IP short message gateway 110 can retrieve a SCCP address associated with the IP address (or other identifier) of the destination from IMS registration information stored at its local storage/memory or at HSS connected to IP short message gateway 110. As discussed in connection with (2) of FIG. 3, association between SCCP address and IP address (or other identifier) of the destination can be identified and stored during user equipment registration process.

At (5), IP short message gateway 110 generates SRI SM Ack (SRI SM acknowledgement) as a response to the SRI SM. The SRI SM Ack contains routing information for short message delivery and the identified SCCP address. More specifically, the identified SCCP address is placed in the SRI SM Ack as the serving MSC/VLR SCCP address. At (6), the IP short message gateway 110 sends the generated SRI SM Ack to SMSC 132.

In some embodiments, HSS has information about SCCP address which was identified to be associated with the IP address of network that recipient user equipment 142 is registered at, and SMSC 132 may request registration information of recipient user equipment 142 from HSS to obtain a SCCP address corresponding to the destination. In response, HSS retrieves a SCCP address, or an association between a SCCP address and an IP address (or other identifier), corresponding to the destination network of the short message and transmits the identified SCCP address to IP-SM-GW 110.

When the SCCP address corresponding to the destination network of the short message becomes available to SMSC 132, the SMSC 132 can perform various actions based on the SCCP address. For example, SMSC 132 can initiate a real-time charging request for short message delivery, make message blocking decision, etc.

At (7), based on the SRI SM Ack from IP short message gateway 110, SMSC 132 generates the MT-FSM (Mobile Terminated Forward Short Message) and transmits the MT-FSM to IP short message gateway 110. More specifically, SMSC 132 adds the SCCP address corresponding to the IP address (or other identifier) of destination network of the short message as serving terminating MSC/VLR address. At (8), based on the MT-FSM received from SMSC 132, IP short message gateway 110 can deliver the short message in the appropriate SIP method towards the S-CSCF 122. In response, S-CSCF 122 forwards the short message to user equipment registered in IP network 140, via other network servicing notes in the IMS core. When the (mobile terminated) short message is successfully delivered to the destination (recipient) user equipment, SMSC 132 generates a CDR which includes the SCCP address. Based on the generated CDR, a billing center of the GSM core 130 can generate billing information for short message delivery between IP network 140 and GSM network 150.

Figure 6:
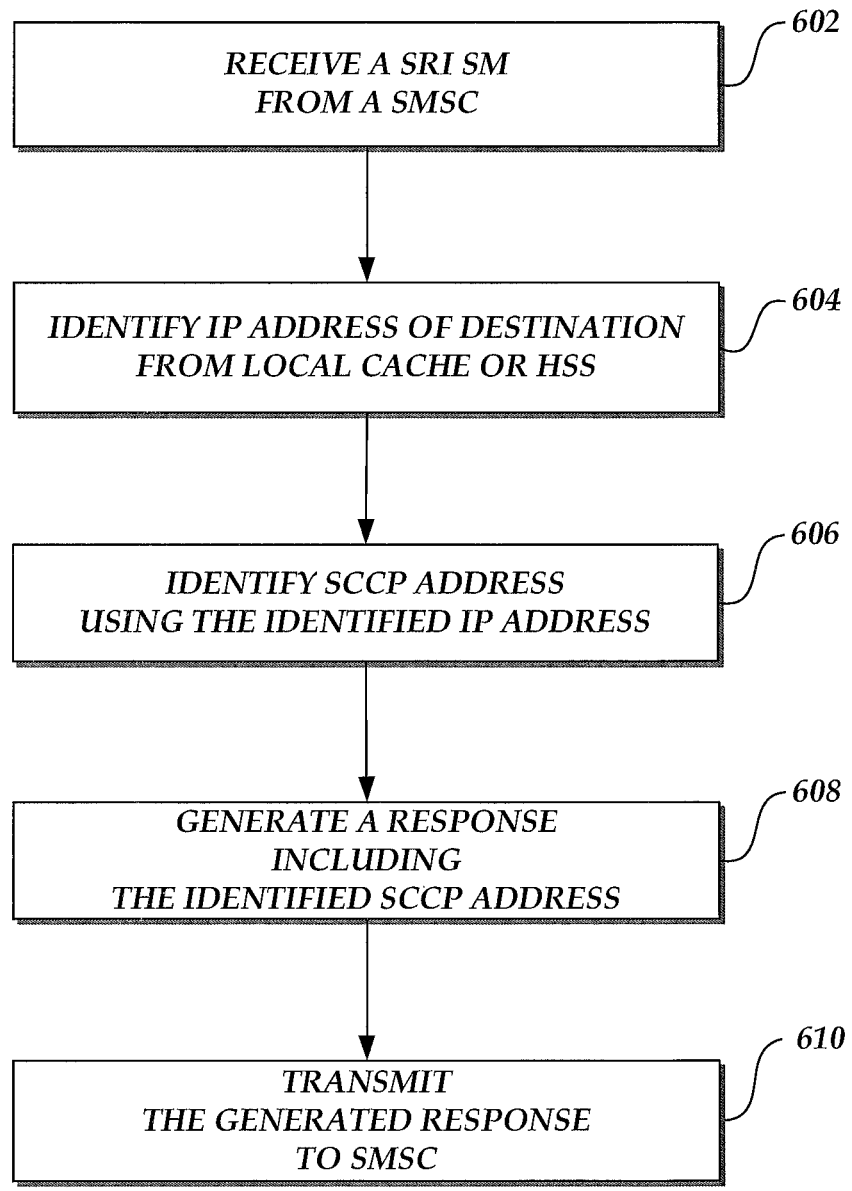
FIG. 6 is a flow diagram illustrative of delivering a short message to a mobile device in an IP network.

FIG. 6 is a flow diagram illustrative of delivering a short message to a mobile device in the IP network.

At block 602, IP short message gateway 110 receives SRI SM (Send Routing Information for Short Message) from SMSC 132. SRI SM from SMSC 132 includes a phone number of the recipient user equipment 142. At block 604, IP short message gateway 110 identifies IP address of recipient user equipment 142 registered at destination network from registration information stored at local storage/memory or HSS. At block 606, IP short message gateway 110 identifies SCCP address that is associated with the IP address of recipient user equipment 142 registered at destination network from registration information stored at local storage/memory or HSS. At block 608, IP short message gateway 110 generates SRI SM Ack (SRI SM acknowledgement) as a response to the SRI SM. SRI SM Ack includes routing information for short message delivery and the identified SCCP address corresponding to the short message's destination network. At block 610, IP short message gateway 110 sends SRI SM Ack (SRI SM acknowledgement) as a response to the SRI SM. As SCCP address can be indicative of IP address of the short message's destination, network elements of IMS core 120 or GSM core 130 can perform various services based on the SCCP address.

It will be appreciated by those skilled in the art and others that this invention can use other indicative indicator(s) or information instead of (or in addition to) IP address of user equipment 142 at originating or destination of IP network in order to identify/distinguish originating or destination network. It will be appreciated by those skilled in the art and others that this invention may use other parameter(s) instead of (or in addition to) SCCP address that are used in GSM protocol to represent originating or destination IP network where equipment 142 is registered at (or originating SMS from or terminating SMS to). It will be appreciated by those skilled in the art and others that this invention is not only applicable to messages communicated between an equipment at IP network and an equipment at GSM network, it is also applicable to message communication between any two different kind of networks or environment using any different messaging or communication protocols or specifications. It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored assume in a computer-readable medium and loaded into memory of the computing device using a drive mechanism associated with a computer readable storage medium storing the computer executable components such as a CD ROM, DVD ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method to deliver a short message between an IP network and a non-IP-based network, the method comprising:
   as implemented by a computing system having a processor and a memory and configured with specific computer-executable instructions and further configured with a plurality of Signaling Connection Control Part (SCCP) addresses, receiving a request in an IP-based format to deliver a short message between the IP network and the non-IP-based network, the request comprising an identifier associated with an origin or a destination of the short message;

identifying, among the plurality of SCCP addresses of the computing system, an SCCP address corresponding to the origin or the destination of the short message based on the identifier in the request;

generating a response to the request in a non-IP-based format, the response comprising the identified SCCP address; and transmitting the generated response to a Short Message Service Center (SMSC) associated with the non-IP-based network, wherein receiving the request in the IP-based format comprises receiving a SIP (session initiation protocol) message from an IMS (IP multimedia subsystem), the SIP message comprising an IP address associated with the origin of the short message, and wherein generating the response to the request in the non-IP-based format comprises generating a mobile originated SMS (MO SMS) based on the identified SCCP address and under MAP (Mobile Application Part) protocol.

2. The method as recited in claim 1, wherein generating the response to the request in the non-IP-based format comprises placing the identified SCCP address as a calling party address of the mobile originated SMS.

3. The method as recited in claim 1, wherein the plurality of SCCP addresses correspond to a plurality of IP address groups respectively, the plurality of IP address groups being organized based on at least one of geographical information, organizational information, or service provider information associated with IP addresses.

4. A system having a plurality of SCCP addresses and comprising:

a computing device comprising a processor coupled to a memory, the memory including specific instructions that upon execution configure the system to:

receive a request in an IP-based format to deliver a short message between an IP network and a non-IP-based network, the request comprising an identifier associated with an origin or destination of the short message;

identify a common SCCP address among a plurality of common SCCP addresses of the system based on the identifier in the request, wherein the common SCCP addresses are associated with two or more mobile devices;

generate a response to the request in a non-IP-based format, the response comprising the identified SCCP address corresponding to the identifier in the request; and transmit the generated response to an SMSC associated with the non-IP-based network, wherein the computing device receives a SIP message from an IMS, the SIP message including an IP address associated with the origin of the short message, and wherein the computing device generates the response to the request by generating a mobile originated SMS based on the identified SCCP address and under MAP protocol.

5. The system as recited in claim 4, wherein the computing device generates the response to the request by placing the identified SCCP address as a calling party address of the mobile originated SMS.

6. The system as recited in claim 4, wherein the plurality of common SCCP addresses correspond to a plurality of IP address groups respectively.

7. The system as recited in claim 6, wherein the plurality of IP address groups are organized based on at least one of geographical information, organizational information, and service provider information associated with IP addresses.

8. A non-transitory, computer-readable storage medium storing computer-executable instructions that, when executed by a computer system, configures the computer system to perform operations comprising:

receiving a request in an IP-based format to deliver a short message between an IP network and a non-IP-based network, the request comprising an identifier associated with an origin or destination of the short message;

identifying an SCCP address among a plurality of SCCP addresses of the computer system based on the identifier in the request;

generating a response to the request in a non-IP-based format, the response comprising the identified SCCP address corresponding to the identifier in the request; and transmitting the generated response to an SMSC associated with the cellular non-IP-based network, wherein receiving the request to deliver the short message service includes receiving a SIP message from an IMS, wherein the SIP message includes an IP address associated with the origin of the short message wherein generating the response to the request includes generating a mobile originated SMS based on the identified SCCP address and under MAP protocol.

9. The method as recited in claim 8, wherein generating the response to the request includes generating a response to the request comprises placing the identified SCCP address as a calling party address of the mobile originated SMS.

* * * * *

UNITED STATES PATENT AND TRADEMARK OFFICE
CERTIFICATE OF CORRECTION

| | | |
|---|---|---|
| PATENT NO. | : 10,200,831 B2 | Page 1 of 1 |
| APPLICATION NO. | : 15/159662 | |
| DATED | : February 5, 2019 | |
| INVENTOR(S) | : Jianchong Yang et al. | |

It is certified that error appears in the above-identified patent and that said Letters Patent is hereby corrected as shown below:

In the Specification

In Column 8, Line 25, change "registratration," to --registration,--.

In Column 8, Line 28, change "strorage" to --storage--.

In Column 8, Line 46, change "strorage" to --storage--.

In Column 9, Line 35, change "and or" to --and/or--.

In Column 9, Line 41, change "and or" to --and/or--.

In the Claims

In Column 14, Line 39, Claim 8, change "the cellular" to --the--.

In Column 14, Lines 48-49, Claim 9, after "includes" delete "generating a response to the request comprises".

Signed and Sealed this
Second Day of July, 2019

Andrei Iancu
*Director of the United States Patent and Trademark Office*